United States Patent
Adams et al.

(10) Patent No.: US 9,151,383 B2
(45) Date of Patent: Oct. 6, 2015

(54) INTERACTIVE TRANSMISSION SHIFT TECHNIQUES

(71) Applicants: Joseph B. Adams, Northville, MI (US); Changwei Cao, West Bloomfield, MI (US); Jason P. Frisch, Phymouth, MI (US); David D. Dicks, Linden, MI (US); Richard G. Mayer, Rochester Hills, MI (US); Joseph J. Sobczak, Clawson, MI (US); William Mayhew, Ann Arbor, MI (US); Raymond J. Tessier, Jr., Onsted, MI (US)

(72) Inventors: Joseph B. Adams, Northville, MI (US); Changwei Cao, West Bloomfield, MI (US); Jason P. Frisch, Phymouth, MI (US); David D. Dicks, Linden, MI (US); Richard G. Mayer, Rochester Hills, MI (US); Joseph J. Sobczak, Clawson, MI (US); William Mayhew, Ann Arbor, MI (US); Raymond J. Tessier, Jr., Onsted, MI (US)

(73) Assignee: FCA US LLC, Auburn Hills, MI (US)

(*) Notice: Subject to any disclaimer, the term of this patent is extended or adjusted under 35 U.S.C. 154(b) by 0 days.

(21) Appl. No.: 14/286,169

(22) Filed: May 23, 2014

(65) Prior Publication Data

US 2014/0358388 A1 Dec. 4, 2014

Related U.S. Application Data

(60) Provisional application No. 61/828,447, filed on May 29, 2013.

(51) Int. Cl.
*B60W 10/02* (2006.01)
*F16H 61/68* (2006.01)
(Continued)

(52) U.S. Cl.
CPC . *F16H 61/68* (2013.01); *B60T 7/12* (2013.01); *B60W 10/02* (2013.01); *B60W 10/115* (2013.01);
(Continued)

(58) Field of Classification Search
CPC ............. F16H 2061/205; F16H 61/20; F16H 2059/6807; F16H 61/12; F16H 2061/1232; F16H 59/36; F16H 2059/663; F16H 2312/04; Y10T 477/60; Y10T 477/82; B60W 30/18118; B60W 10/182; B60W 10/02; B60W 2710/1005; B60W 2550/142; B60W 10/10
USPC .......... 701/60, 65; 477/34, 188, 901; 475/303
See application file for complete search history.

(56) References Cited

U.S. PATENT DOCUMENTS

| 5,788,040 | A | 8/1998 | Moorman et al. |
| 8,046,144 | B2 | 10/2011 | Lowe et al. |

(Continued)

FOREIGN PATENT DOCUMENTS

| DE | 19949203 A1 | 4/2000 |
| DE | 102009052227 A1 | 5/2011 |

OTHER PUBLICATIONS

International Search Report and Written Opinion dated Aug. 26, 2014 for International Application No. PCT/US2014/039663, International Filing Date May 26, 2014.

*Primary Examiner* — Roger Pang
(74) *Attorney, Agent, or Firm* — Ralph E. Smith

(57) ABSTRACT

A method for interactive transmission garage shifts includes receiving a request for a transmission garage shift; controlling the transmission to bring the vehicle to a stop state based on determining that the vehicle is rolling backwards on a grade above a predetermined grade threshold and at a speed below a predetermined speed threshold; controlling an electric park brake (EPB) to hold the vehicle at the stop state; controlling the transmission to engage a dog clutch so as to place the transmission in a forward drive gear; and controlling the EPB to i) deactivate if the dog clutch is determined to be engaged, or ii) maintain activation to maintain the vehicle at the stop state if the dog clutch is determined to be disengaged.

18 Claims, 6 Drawing Sheets

(51) Int. Cl.
*F16H 59/36* (2006.01)
*F16H 63/48* (2006.01)
*B60T 7/12* (2006.01)
*B60W 10/115* (2012.01)
*B60W 10/18* (2012.01)
*B60W 30/18* (2012.01)
*B60W 10/10* (2012.01)
*F16H 61/20* (2006.01)
*F16H 59/68* (2006.01)
*F16H 61/12* (2010.01)
*F16H 59/66* (2006.01)

(52) U.S. Cl.
CPC ....... *B60W 10/182* (2013.01); *B60W 30/18118* (2013.01); *F16H 59/36* (2013.01); *F16H 63/48* (2013.01); *B60T 2201/06* (2013.01); *B60W 10/10* (2013.01); *B60W 2550/142* (2013.01); *B60W 2710/0666* (2013.01); *B60W 2710/1005* (2013.01); *B60Y 2400/421* (2013.01); *F16H 61/20* (2013.01); *F16H 2059/663* (2013.01); *F16H 2059/6807* (2013.01); *F16H 2061/1232* (2013.01); *F16H 2061/205* (2013.01); *F16H 2312/04* (2013.01); *Y10T 477/60* (2015.01)

(56) References Cited

U.S. PATENT DOCUMENTS

| | | | |
|---|---|---|---|
| 8,500,601 B2 * | 8/2013 | Arnold et al. | 477/154 |
| 2005/0246081 A1 | 11/2005 | Bonnet et al. | |
| 2008/0269014 A1 | 10/2008 | Chen et al. | |
| 2011/0297505 A1 * | 12/2011 | Heuver | 192/219.5 |
| 2012/0283064 A1 * | 11/2012 | Herbeth et al. | 475/275 |
| 2014/0051543 A1 | 2/2014 | Dourra et al. | |
| 2014/0236439 A1 * | 8/2014 | Arnold et al. | 701/60 |
| 2015/0072831 A1 * | 3/2015 | Sakata | 477/5 |

* cited by examiner

INTERACTIVE TRANSMISSION SHIFT TECHNIQUES

CROSS-REFERENCE TO RELATED APPLICATIONS

This application claims benefit of U.S. Provisional Application Ser. No. 61/828,447 filed on May 29, 2013. The disclosure of the above application is incorporated herein by reference in its entirety.

FIELD

The present disclosure relates generally to techniques for improving vehicle transmission garage shifts and, more particularly to techniques for improving vehicle garage shifts through interactive use of a vehicle braking system.

BACKGROUND

Vehicle garage shifts include stationary or substantially stationary garage shifts, such as shifts from park (P) to drive (D) and neutral (N) to D. Vehicle garage shifts can also include stationary or rolling garage shifts, such as from reverse (R) to D and D to R. Vehicle transmissions typically include a plurality of clutches for transmitting rotational energy from the engine to the wheels of the vehicle. The plurality of clutches are selectively engaged and disengaged to shift the transmission into the desired ratio, such as when performing a stationary or rolling garage shift. When a vehicle is on a grade, the vehicle may move or roll due to the grade while a driver of the vehicle is requesting a garage shift. Such rolling may result in poor shift quality and/or, under certain conditions, prevent the transmission from shifting into the desired gear. Thus, while current vehicle transmission shift strategies work for their intended purpose, there remains a need for improvement in the relevant art.

SUMMARY

In one aspect, a method for shifting a transmission for a vehicle is provided in accordance with the teachings of the present disclosure. In an exemplary implementation, the method includes receiving, at one or more controllers of the vehicle, the one or more controllers having one or more processors, a request for a transmission garage shift to a forward drive gear; determining, at the one or more controllers, whether the vehicle is on a grade greater than a predetermined grade threshold and whether the vehicle is rolling backwards on the grade below a predetermined speed threshold; controlling, by the one or more controllers, the transmission to bring the vehicle to a stop state based on determining that the vehicle is on the grade greater than the predetermined grade threshold and rolling backwards below the predetermined speed threshold; controlling, by the one or more controllers, an electric park brake (EPB) to hold the vehicle at the stop state; controlling, by the one or more controllers, the transmission to engage a dog clutch so as to place the transmission in the forward drive gear; determining, by the one or more controllers, whether the dog clutch is or is not engaged; and controlling, by the one or more controllers, the EPB to i) deactivate if the dog clutch is determined to be engaged, or ii) maintain activation to maintain the vehicle at the stop state if the dog clutch is determined to be not engaged.

In another aspect, a method for shifting a transmission for a vehicle is provided in accordance with the teachings of the present disclosure. In an exemplary implementation, the method includes receiving, at one or more controllers of the vehicle, the one or more controllers having one or more processors, a request for a transmission garage shift to a forward drive gear; determining, at the one or more controllers, whether the vehicle is on a grade greater than a predetermined grade threshold and whether the vehicle is rolling backwards on the grade below a predetermined speed threshold; controlling, by the one or more controllers, the transmission to engage a plurality of transmission clutches to bring the vehicle to a stop state based on determining that the vehicle is on the grade greater than the predetermined grade threshold and rolling backwards below the predetermined speed threshold; controlling, by the one or more controllers, an electric park brake (EPB) to hold the vehicle at the stop state; controlling, by the one or more controllers, the transmission to engage a dog clutch so as to place the transmission in the forward drive gear; determining, by the one or more controllers, whether the dog clutch is or is not engaged; controlling, by the one or more controllers, after determining the dog clutch is not engaged, the transmission to cycle a friction clutch between an engaged and disengaged state to facilitate engagement of the dog clutch; determining, by the one or more controllers, after cycling the friction clutch, whether the dog clutch is or is not engaged; and controlling, by the one or more controllers, the EPB to i) deactivate if the dog clutch is determined to be engaged, or ii) maintain activation to maintain the vehicle at the stop state if the dog clutch is determined to be not engaged.

In some implementations, controlling, by the one or more controllers, the transmission to engage the plurality of transmission clutches to bring the vehicle to the stop state includes engaging three clutches and slipping one or more friction clutches of the three clutches to transition the transmission to a state where the transmission output is bound.

In some implementations, the method includes receiving, at the one or more controllers, a request for an increase in engine torque; determining, at the one or more controllers, whether the request for the increase in engine torque is above a predetermined engagement threshold for engagement of the dog clutch; controlling, by the one or more controllers, after determining the request for the increase in engine torque is above the predetermined engagement threshold, the engine to temporarily override the request for the increase in engine torque; and controlling, by the one or more controllers, the engine to transition to the request for the increase in engine torque after controlling the EPB to deactivate.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

Figure 1:
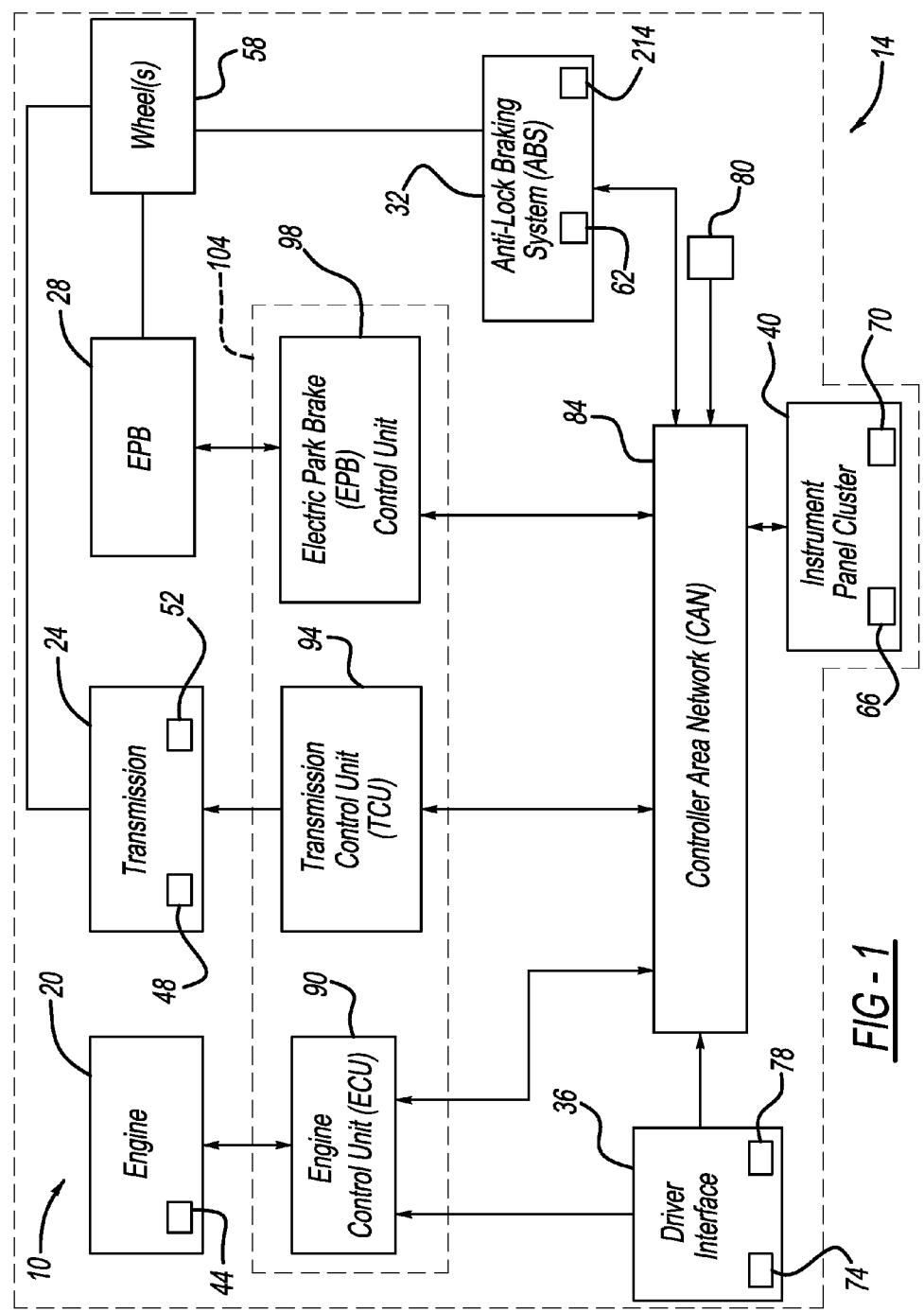
FIG. 1 is a schematic block diagram of an exemplary vehicle system according to the principles of the present disclosure.

With initial reference to FIG. 1, an exemplary vehicle system is schematically shown and generally identified at reference numeral 10. In accordance with various aspects of the present disclosure, interactive transmission shift techniques are implemented utilizing the vehicle system 10. As will be discussed in greater detail below, in one example implementation the interactive transmission shift techniques include utilizing aspects of a vehicle braking system to temporarily hold a vehicle until a successful shift into a desired forward drive gear, such as first gear, has been completed. In various aspects, the transmission is controlled to assist in bringing a vehicle rolling on a grade to a stop and the vehicle braking system is utilized to temporarily hold the vehicle until a successful garage shift has been completed, as will also be discussed in greater detail below. Such interactive transmission shift techniques provide for improved transmission shifts into a forward drive gear, such as first and/or second gear, especially for transmissions utilizing one or more dog clutches for first and/or second gear power flow, as well as improved shift quality from a vehicle occupant perspective. It will be appreciated that while the discussion will continue with reference to the forward gear being first or second gear, the interactive transmission shift techniques of the present disclosure may also be utilized for other forward gears, such as third and fourth gears.

With continuing reference to FIG. 1, the exemplary vehicle system 10 is associated with an exemplary vehicle 14 and includes an engine 20, a transmission 24, an electric park brake (EPB) system 28, an anti-lock brake system (ABS) 32, a driver interface 36 and an instrument panel or cluster 40. The engine 20 includes an engine speed sensor 44. The transmission 24 includes various transmission speed sensors, such as input and output transmission shaft speed sensors 48 and various clutch engagement sensors 52, such as pressure sensors, to provide a signal to an associated control system indicative of engagement of an associated clutch. The transmission 24, EPB 28 and ABS 32 are coupled or selectively coupled, directly or indirectly, to one or more wheels 58 of vehicle 14, as is known in the art.

In the exemplary implementation illustrated, the ABS 32 includes one or more wheel speed sensors 62 and the instrument panel cluster 40 includes various indicators, such as a transmission service light or indicator 66 and an EPB park state light or indicator 70. The driver interface 36 includes a driver input device, e.g., an accelerator pedal 74, for providing a driver input, e.g., a torque request, for engine 20. The driver interface 36 or vehicle interior also includes a transmission shift request device, such as a shift lever or rotary shifter 78, for the driver to request a desired transmission 24 gear. The vehicle system 10 also includes a longitudinal sensor 80 or other equivalent sensor for providing data indicative of whether or not the vehicle 14 is on a grade and the incline or angle of the grade.

One or more controllers are utilized to control the various vehicle components or system discussed above. In one exemplary implementation, various individual controllers are utilized to control the various components/systems discussed herein and are in communication with each other and/or the various components/systems via a local interface 84. In this exemplary implementation, the local interface 84 is one or more buses or other wired or wireless connections, as is known in the art. In the example illustrated in FIG. 1, the local interface 84 is a controller area network (CAN). The CAN 84 may include additional elements or features, which have been omitted for simplicity, such as controllers, buffers (cache) drivers, repeaters and receivers, among many others, to enable communications. Further, the CAN 84 may include address, control and/or data connections to enable appropriate communications among the components/systems described herein.

In the example illustrated in FIG. 1, the vehicle system 10 includes an engine control unit (ECU) 90 for controlling engine 20, a transmission control unit (TCU) 94 for controlling transmission 24, and an EPB control unit 98 for controlling EPB 28. Each of the control units (90, 94, 98) as well as the ABS 32, driver interface 36, instrument cluster 40 and longitudinal sensor 36 are in communication with CAN 84 and thus each other. It will be appreciated that while individual control units are discussed herein and shown in various Figures, the individual control units may also be optionally implemented in the form of one control unit, such as a powertrain or vehicle control unit, represented by broken line 104 in FIG. 1. Thus, it will be appreciated that while the discussion will continue with reference to the individual controllers discussed above, the discussion is equally applicable to the components of vehicle system 10 being controlled by one controller.

Figures 2, 4:
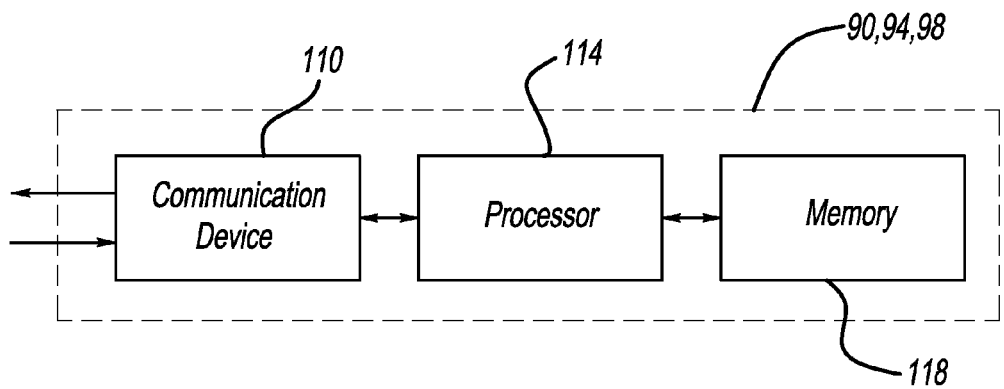
FIG. 2 is an example functional block diagram of an exemplary controller of the vehicle system of FIG. 1 according to the principles of the present disclosure.
FIG. 4 is a table illustrating exemplary clutch application and shift sequences for the transmission of FIG. 2 according to the principles of the present disclosure.

Referring now to FIG. 2 and with reference back to FIG. 1, an example functional block diagram of each of the controllers 90, 94, 98 is illustrated. Each of the controllers 90, 94, 98 includes a communication device 110, a processor 114, and a memory 118. The communication device 110 includes suitable components, e.g., a transceiver, configured to communicate with other components of the vehicle system 10 via the controller area network 84. The memory 118 is any suitable storage medium (flash, hard disk, etc.) configured to store information at the respective controller 90, 94, 98. The processor 114 controls operation of the respective controller 90, 94, 98, and thus controls operation of the associated systems or components. Examples of functions performed by the processor 114 include loading/executing an operating system of the respective controller 90, 94, 98, controlling transmission by and processing information received via the communication device 110, and controlling read/write operations at the memory 118. It will be appreciated that the term "processor" as used herein refers to both a single processor and two or more processors operating in a parallel or distributed architecture.

Figure 3:
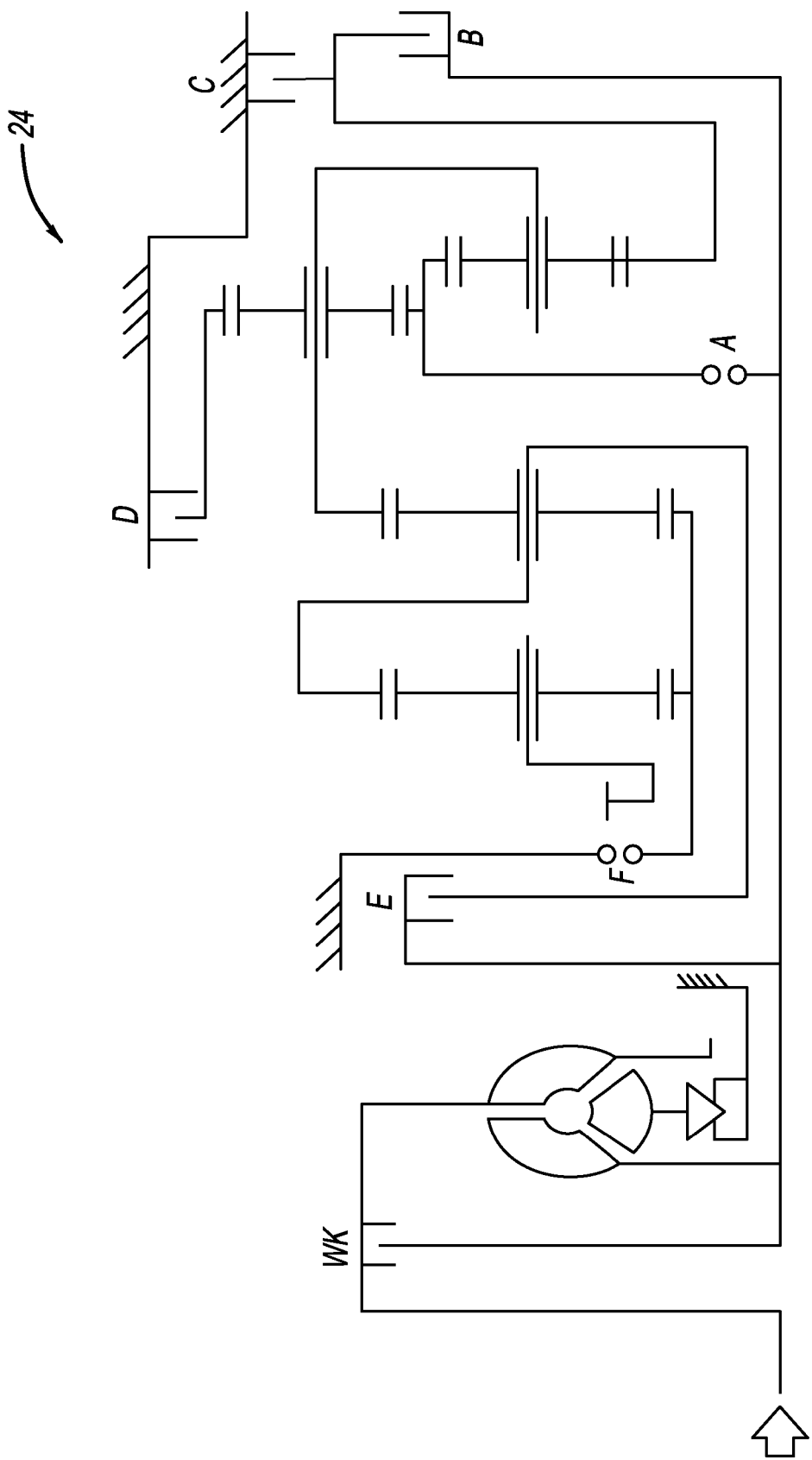
FIG. 3 is a partial schematic illustration of an exemplary transmission of the vehicle system of FIG. 1 according to the principles of the present disclosure.
Figure 5:
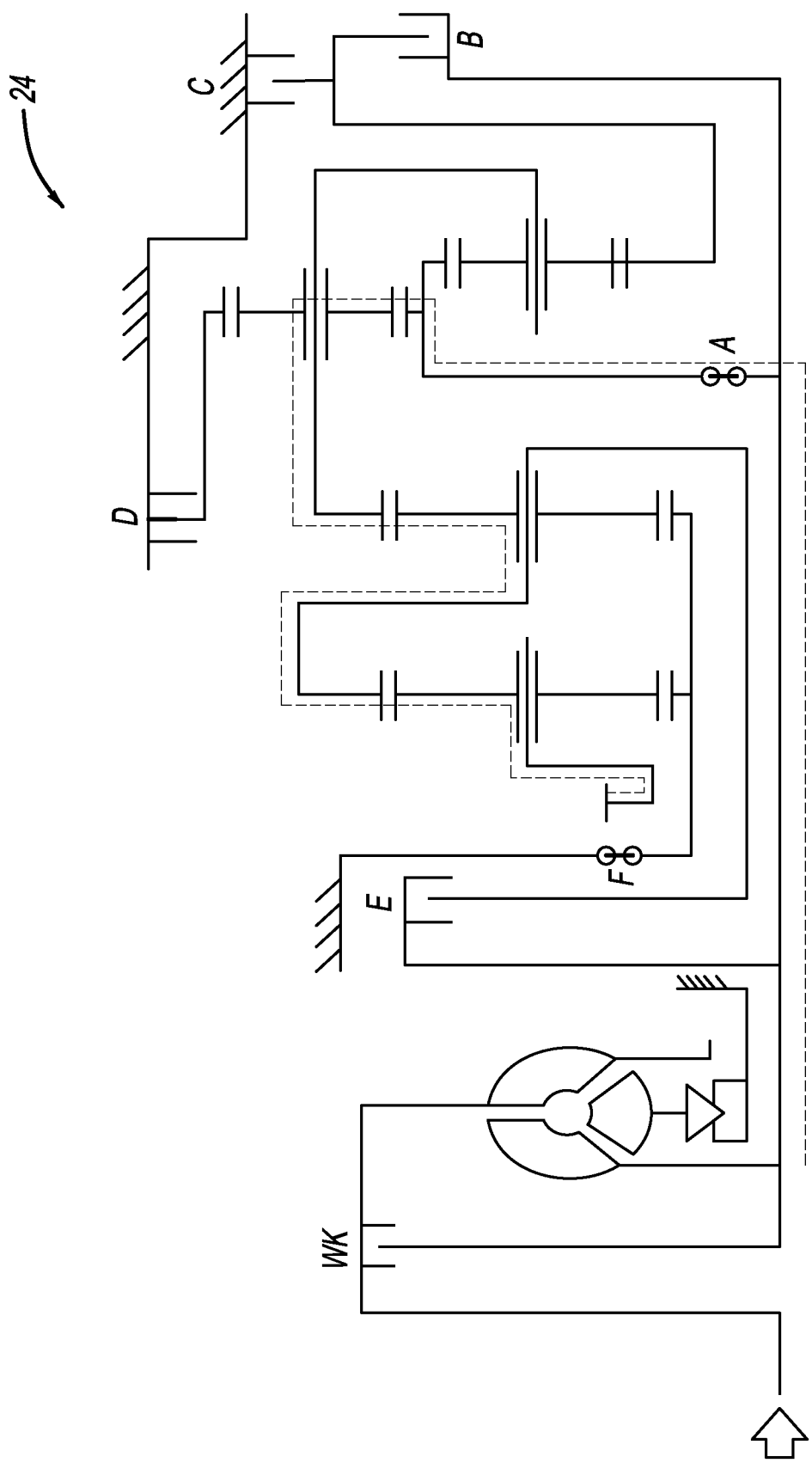
FIG. 5 is a partial schematic illustration of the transmission of FIG. 2 showing power flow in first gear according to the principles of the present disclosure.

Turning now to FIGS. 3-5, a partial schematic diagram of the example transmission 24 is shown in FIG. 3. In this example illustration, transmission 24 is an electronically controlled shift-by-wire automatic transmission. In one exemplary implementation, transmission 24 is a nine-speed automatic transmission having at least one drive engagement clutch, such as a dog clutch, that is engaged for power flow in drive (D). As shown in FIG. 3, exemplary transmission 24 includes six brakes/clutches (A, B, C, D, E and F) that are selectively engaged, as shown in the table in FIG. 4, in various combinations to provide nine forward gear ratios and reverse (R).

For example, clutch D as well as dog clutches A and F are engaged to provide power flow for first gear, as shown in FIG. 5 with reference to FIGS. 3 and 4. For the exemplary transmission 24, dog clutch F is activated/engaged with or substantially in connection with an engine-start procedure of the associated vehicle 14 and, for first gear when a garage shift to drive is requested, clutches D and A are then activated/engaged. However, as clutch A is a dog clutch, if the vehicle 14 is moving in an opposite direction as would be for forward movement in first and/or second gear (e.g., rolling backwards on a grade), the dog clutch A cannot be fully synchronized. This scenario may result in either transmission 24 not being able to successfully engage dog clutch A and thus not enter first gear and/or perceived poor shift quality by a driver or vehicle occupant.

Accordingly, systems and methods or techniques are provided for interactive transmission garage shifts using various aspects of the vehicle braking system. One example implementation of such interactive transmission shift techniques is discussed below in connection with the exemplary flowchart 200 shown in FIGS. 6A-6B together with the exemplary vehicle system 10 and its components/sub-systems shown in FIGS. 1-5.

Figure 6A:
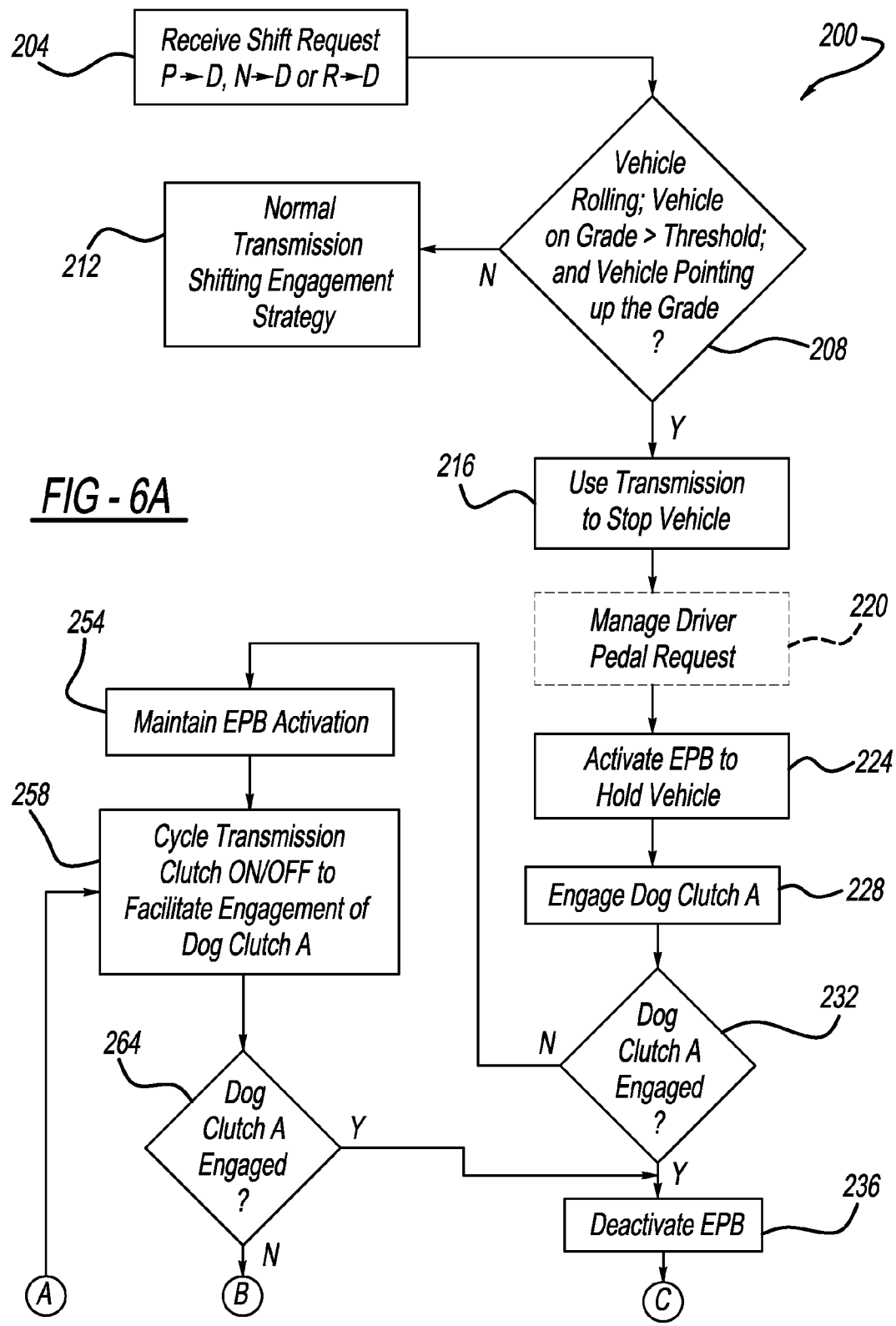
FIGS. 6A-6B illustrate an exemplary flow diagram for interactive transmission shift techniques utilizing aspects of a vehicle braking system in accordance with the principles of the present disclosure.
Figure 6B:
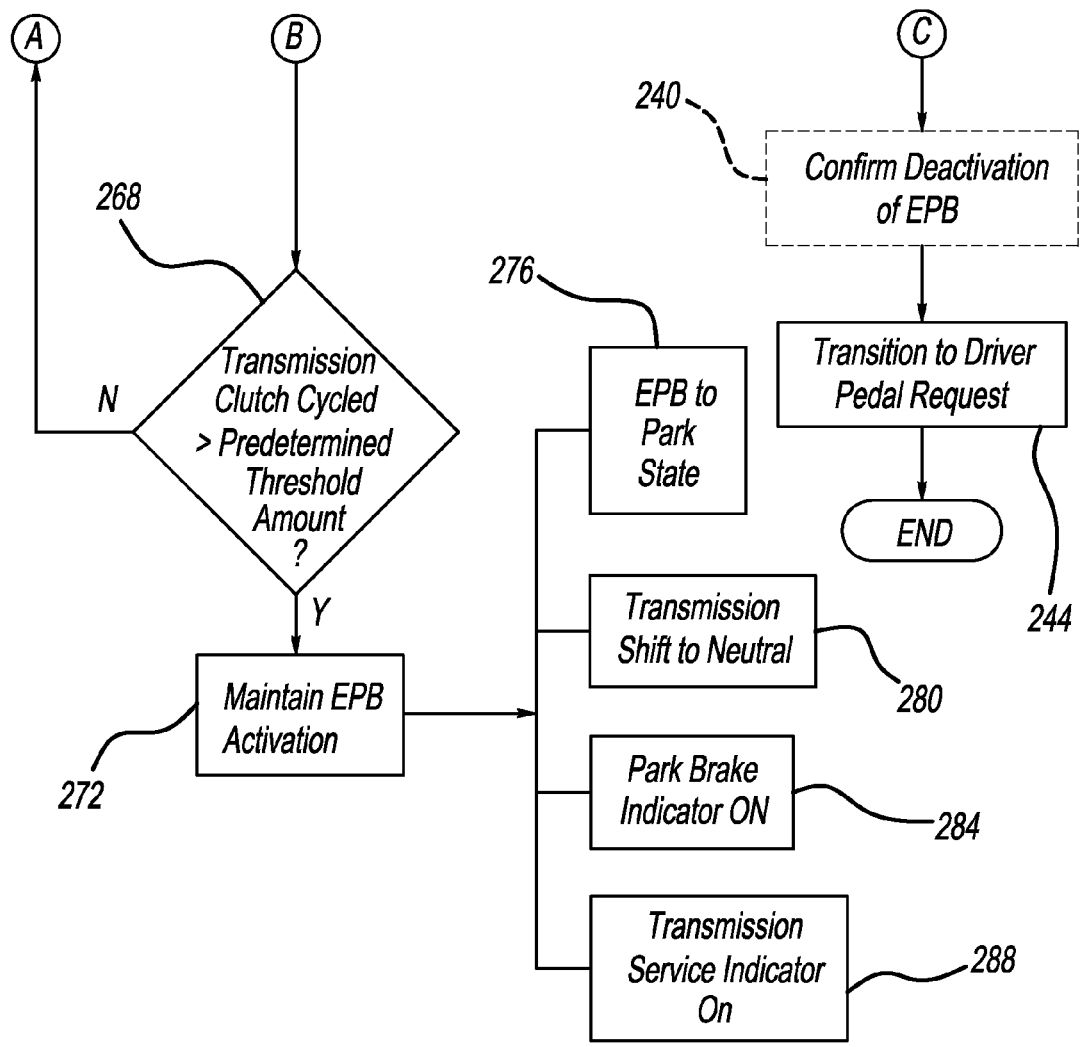

With particular reference to FIGS. 6A-6B, the exemplary methodology 200 includes the TCU 94 receiving a shift request for a garage shift at block 204. In one exemplary aspect, the shift request can be initiated from the transmission shift device 78 associated with driver interface 36. The shift request, for this exemplary interactive transmission shift techniques discussed herein, will be for a garage shift from P→D, N→D or R→D. The TCU 94 will determine whether the vehicle 14 meets certain acceptance criteria for the interactive transmission shift technique methodology at block 208. In the exemplary implementation illustrated, the TCU 94 will determine whether vehicle 14 is moving or rolling, whether the vehicle 14 is on a grade, and whether the vehicle 14 is pointing up or down the grade at decision block 208.

In one exemplary implementation, the TCU 94 will determine if the vehicle 14 is rolling backwards (e.g., in a direction opposite of the desired movement in first gear) at a speed greater than zero KPH and less than a predetermined speed threshold using input from the transmission speed sensors 48 and/or the wheel speed sensors 62 and the longitudinal sensor 80. In one example implementation, the predetermined speed threshold is 5 KPH. The TCU 94 will also determine if the grade is greater than a predetermined grade threshold using input received from the longitudinal sensor 80. In one exemplary implementation, the predetermined grade threshold is six percent. It will be appreciated that while examples of 5 KPH and six percent are discussed above, various different thresholds may be utilized as may be desired for different vehicle 14 and/or powertrain configurations.

If TCU 94 determines that the vehicle 14 is not rolling or is rolling at a speed greater than the predetermined speed threshold, or that the vehicle 14 is not on a grade greater than the predetermined grade threshold, or that the vehicle is not rolling backwards down the grade, then the interactive transmission shift methodology ends and the TCU 94 controls transmission 24 according to normal transmission shift engagement strategies at block 212. On the other hand, if TCU 94 determines that the acceptance criteria of block 208 is met, the methodology continues to block 216.

At block 216, the TCU 94 controls the transmission 24 to bring the rolling vehicle 14 to a stop. In one exemplary implementation, the TCU 94 controls the transmission 24 to engage certain clutches to bind the transmission output to bring vehicle 14 to a stop. For the exemplary transmission 24 shown in FIGS. 1 and 3-5, three clutches may be engaged to provide power flow in each of the various gears, as particularly shown in FIG. 4. Using first gear as an example, clutches D, F and A are engaged to provide transmission 24 power flow. Using the interactive transmission shift techniques of the present disclosure, when the vehicle 14 is rolling backwards and the vehicle system 10 is being controlled to facilitate engagement of dog clutch A, a different set of clutches are engaged and/or temporarily engaged to bind the transmission output and bring rolling vehicle 14 to a stop.

In one example implementation, TCU 94 controls the transmission 24 to engage clutches C, D and F to bind the transmission output and bring vehicle 14 to a stop. In this example, the clutch C can be temporarily engaged and can be modulated or slipped, as may be required, to bring the vehicle 14 to a controlled stop. As will be understood with reference to FIG. 4, the exemplary set of clutches C, D and F utilized to bind the transmission output is different than each set of clutches utilized to provide power flow in the various transmission gears. In this example, the drive engagement dog clutch A is not yet engaged. During this process of engaging clutches C, D and F to bring vehicle 14 to a stop, clutch E may also be controllably engaged, as needed, to synchronize (e.g., reduce) the transmission turbine speed to facilitate engagement of dog clutch A. It will be appreciated that while the methodology 200 is discussed with a shift request to drive in connection with first gear of transmission 24, the methodology 200 may also be utilized with a shift request to drive in connection with other forward drive gears of transmission 24.

In accordance with an aspect of the present disclosure, the ABS 32 may also be utilized to bring rolling vehicle 14 to a stop. In one exemplary implementation, the ABS 32 may be utilized together with the transmission 24 to bring the vehicle 14 to a stop. In this example, the ABS 32 is controlled to activate the foundation brakes 214 to assist the transmission 24 in bringing rolling vehicle 14 to a stop. In an alternative implementation, the ABS 32 may be controlled to bring the vehicle 14 to a stop without using the transmission 24 in the manner discussed above at block 216. Vehicle speed data received from the transmission speed sensors 48 and/or wheel speed sensors 62 may be utilized by one or more controllers of the vehicle system 10 to determine when the vehicle 14 has been brought to a stop.

At block 220, any driver pedal request input in the form of a torque request that is received, such as from accelerator pedal 74 of driver interface 36, will be managed by the TCU 94 in connection with the ECU 90 to facilitate implementation of the interactive transmission shift techniques for engagement of dog clutch A. For example, if there is a driver torque demand that is greater than a desired and/or predetermined torque level to synchronize and engage the dog clutch A, the TCU 94 will limit the amount of engine torque to the desired level during this process. In one exemplary implementation, such driver request for engine torque will be managed by the TCU 94 such that the ECU 90 will honor a TCU 94 request to ramp down or temporarily disregard such torque request while the vehicle system 10 is attempting to engage dog clutch A using the interactive transmission shift techniques of the present disclosure. In other words, the ECU 90 will honor a TCU 94 request over a driver pedal request.

It will be appreciated that while managing the driver pedal request is shown at block 216 in exemplary methodology 200, such driver pedal request management may also be implemented before, during and/or after blocks 204, 208 and 216.

In this regard, such driver pedal request management will continue in methodology 200 until the TCU 94 in connection with the ECU 90 controls the engine 20 to transition to the driver pedal request at block 244, or the methodology ends.

With vehicle 14 at a stop or substantially at a stop, the TCU 94 sends a signal, such as over CAN 84, to request actuation of the EPB 28 at block 224. The EPB 28 is actuated to clamp one or more wheels 58 of the vehicle 14 to hold the vehicle from moving so as to facilitate engagement of the dog clutch A. In one exemplary implementation, the EPB 28 temporarily clamps two rear wheels 58 of the vehicle 14. In an alternative implementation, the TCU 94 can send a request to engage the foundation brakes 214 (FIG. 1) via the ABS 32 to hold the vehicle 14. In this alternative implementation, the ABS 32 can also be used to bring the vehicle 14 to a stop in place of using the transmission 24 or in addition thereto, as discussed above. In another exemplary implementation, the transmission 24 can be used to bring the vehicle 14 to a stop and the EPB 28 can initially be used to hold the vehicle 14 (as discussed above). The load can then be transferred to the foundation brakes (via the ABS 32) to hold the vehicle 14 and the EPB 28 can be released. The discussion will continue with reference to the example implementation where the EPB 28 is utilized to hold vehicle 14.

With the vehicle 14 at a stop and temporarily being held from moving via the EPB 28, the TCU 94 will control the transmission 24 to engage the dog clutch A at block 228. The TCU 94 will then confirm engagement of dog clutch A at decision block 232. For example, one of the clutch engagement sensors 52 of transmission 24 associated with dog clutch A provides a signal to the TCU 94 indicative of engagement or lack of engagement of dog clutch A. In one exemplary implementation, the engagement sensor 52 associated with dog clutch A is a pressure sensor.

If the dog clutch A is determined to be engaged at block 232, the methodology 200 continues to block 236, where a signal is sent, such as by the TCU 94, to disengage the EPB 28 (and/or ABS 32, where applicable). In one exemplary implementation, the signal to release the EPB 28 is sent after confirmation that the dog clutch A is engaged and the transmission 24 is in first gear. The methodology 200 may also include an optional step of confirming deactivation or release of the EPB 28 at block 240, such as by the EPB control unit 98 sending a signal indicative of release or deactivation to the CAN 84.

With the EPB 28 released, the TCU 94 and the ECU 90 cooperate at block 244 to transition engine torque back to driver demand (i.e., driver pedal request). In this process, the ECU 90 will thus cooperate with the TCU 94 to honor a TCU 94 request to return engine 20 torque back to the driver demand. For example, the TCU 94 and ECU 90 cooperate to ramp up the engine 20 torque back to the level of driver demand while coordinating with the release of the EPB 28 and vehicle environmental conditions so as to make the transition smooth and minimize or eliminate any vehicle 14 squat.

Returning to block 232, if the TCU 94 determines that the dog clutch A is not engaged, such as based on a signal from clutch engagement pressure sensor 52 associated with dog clutch A, the methodology 200 continues to block 254. At block 254, the vehicle system 10 maintains the EPB 28 activation to continue to hold vehicle 14.

At block 258, the vehicle system 10 implements a diagnostic and/or dog clutch engagement strategy to facilitate engagement of dog clutch A. In one exemplary implementation, engagement of dog clutch A may require, in certain scenarios, actuation of one or more of the transmission 24 clutches. For example, if the dog clutch A does not initially engage, it can be manipulated or jiggled into engagement through actuation of one or more transmission 24 clutches, such as clutch D. In this example, clutch D is cycled (e.g., turned on and off) by command from TCU 94 to facilitate manipulating dog clutch A into engagement. In one particular implementation, clutch D may be actuated/cycled by command from TCU 94 to take a torque load off of dog clutch A to relieve a potential spline lock condition of dog clutch A thereby facilitating engagement of dog clutch A.

Upon cycling clutch D as discussed above, the TCU 94 will determine whether dog clutch A is engaged at block 264, such as from a signal from pressure engagement sensor 52 in a similar manner as discussed above with reference to block 232. If the TCU 94 determines that dog clutch A is engaged, the methodology 200 proceeds to block 236 and continues therefrom in the same or substantially the same manner as discussed above.

If the TCU 94 determines that dog clutch A is not engaged at block 264, the number of times the transmission 24 has been controlled to cycle clutch D is compared to a predetermined threshold at block 268. In one exemplary implementation, the predetermined threshold is between three and five times. The cycling of clutch D at block 258 can include one cycle of clutch D or a set of cycles of clutch D. In this regard, the exemplary predetermined threshold of three to five cycles is with reference to three to five individual cycles or three to five sets of cycles, where each set includes more than one cycle of clutch D. If the number of cycles is below the predetermined threshold, the methodology 200 proceeds back to block 258 and continues with the dog clutch A engagement strategy discussed above until either the dog clutch A is engaged, or the number of times the transmission 24 is commanded to cycle clutch D exceeds the predetermined threshold at block 268.

In a scenario where the dog clutch A was not engaged through the process discussed above at blocks 258, 264 and 268, the methodology proceeds to block 272, where the TCU 94 sends a signal to maintain the EPB 28 activation. At the same time or subsequent thereto, the EPB 28 is controlled to transition to a park state at block 276, the transmission 24 is controlled to shift to a neutral gear at block 280, the instrument cluster 40 is controlled to illuminate or activate the EPB park status indicator 70 and the transmission service indicator 66 at blocks 284 and 288, respectively.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A method for shifting a transmission for a vehicle, comprising:

receiving, at one or more controllers of the vehicle, the one or more controllers having one or more processors, a request for a transmission garage shift to a forward drive gear;

determining, at the one or more controllers, whether the vehicle is on a grade greater than a predetermined grade threshold and whether the vehicle is rolling backwards on the grade below a predetermined speed threshold;

controlling, by the one or more controllers, the transmission to bring the vehicle to a stop state based on determining that the vehicle is on the grade greater than the predetermined grade threshold and rolling backwards below the predetermined speed threshold;

controlling, by the one or more controllers, an electric park brake (EPB) to hold the vehicle at the stop state;

controlling, by the one or more controllers, the transmission to engage a dog clutch so as to place the transmission in the forward drive gear;

determining, by the one or more controllers, whether the dog clutch is or is not engaged; and controlling, by the one or more controllers, the EPB to i) deactivate if the dog clutch is determined to be engaged, or ii) maintain activation to maintain the vehicle at the stop state if the dog clutch is determined to be not engaged.

2. The method of claim 1, further comprising:

controlling, by the one or more controllers, after determining the dog clutch is not engaged, the transmission to cycle a friction clutch between an engaged and disengaged state to facilitate engagement of the dog clutch;

determining, by the one or more controllers, after cycling the friction clutch, whether the dog clutch is or is not engaged; and controlling, by the one or more controllers, the EPB to i) deactivate if the dog clutch is determined to be engaged, or ii) maintain activation to maintain the vehicle at the stop state if the dog clutch is determined to be not engaged.

3. The method of claim 2, wherein controlling, by the one or more controllers, the transmission to bring the vehicle to the stop state includes controlling, by the one or more controllers, the transmission to engage a plurality of transmission clutches to bind an output of the transmission to bring the vehicle to the stop state.

4. The method of claim 3, wherein controlling, by the one or more controllers, the transmission to engage the plurality of transmission clutches to bind the output of the transmission to bring the vehicle to the stop state includes engaging three clutches and slipping one friction clutch of the three clutches to transition the transmission to a state where the transmission output is bound.

5. The method of claim 2, further comprising:

receiving, at the one or more controllers, a request for an increase in engine torque;

determining, at the one or more controllers, whether the request for the increase in engine torque is above a predetermined engagement threshold for engagement of the dog clutch; and controlling, by the one or more controllers, after determining the request for the increase in engine torque is above the predetermined engagement threshold, the engine to temporarily override the request for the increase in engine torque.

6. The method of claim 5, further comprising controlling, by the one or more controllers, the engine to transition to the request for the increase in engine torque after controlling the EPB to deactivate.

7. The method of claim 2, wherein controlling, by the one or more controllers, after determining the dog clutch is not engaged, the transmission to cycle the friction clutch between the engaged and disengaged states includes cycling the friction clutch between the engaged and disengaged states to lower or remove a torque load on the dog clutch to relieve a spline lock condition of the dog clutch.

8. The method of claim 2, further comprising determining, by the one or more controllers, after cycling the friction clutch and after subsequently determining the dog clutch is not engaged, whether the friction clutch has been cycled more than a predetermined cycle threshold; and controlling, by the one or more controllers, the transmission to: i) repeat the cycling of the friction clutch based on determining that the friction clutch has been cycled less than the predetermined cycle threshold, or ii) shift to a neutral gear based on determining that the friction clutch has been cycled greater than the predetermined cycle threshold.

9. The method of claim 8, further comprising controlling, by the one or more controllers, an instrument panel of the vehicle to activate a transmission service indicator based on the one or more controllers controlling the transmission to shift to the neutral gear.

10. The method of claim 9, further comprising controlling, by the one or more controllers, the EPB to transition to a park state based on determining that the dog clutch is not engaged and the friction clutch has been cycled greater than the predetermined cycle threshold.

11. The method of claim 10, further comprising controlling, by the one or more controllers, the instrument panel of the vehicle to activate an EPB park state indicator based on controlling the EPB to transition to the park state.

12. The method of claim 1, wherein receiving, at the one or more controllers, the request for the transmission garage shift to the forward drive gear, includes receiving, at the one or more controllers, the request for the transmission garage shift from park to drive, neutral to drive or reverse to drive.

13. The method of claim 1, wherein determining, at the one or more controllers, whether the vehicle is on the grade greater than the predetermined grade threshold and whether the vehicle is rolling backward on the grade below the predetermined speed threshold includes determining, at the one or more controllers, whether the vehicle is on the grade greater than six percent and whether the vehicle is rolling backward on the grade below 5 KPH.

14. A method for shifting a transmission for a vehicle, comprising:

receiving, at one or more controllers of the vehicle, the one or more controllers having one or more processors, a request for a transmission garage shift to a forward drive gear;

determining, at the one or more controllers, whether the vehicle is on a grade greater than a predetermined grade threshold and whether the vehicle is rolling backwards on the grade below a predetermined speed threshold;

controlling, by the one or more controllers, the transmission to engage a plurality of transmission clutches to bring the vehicle to a stop state based on determining that the vehicle is on the grade greater than the predetermined grade threshold and rolling backwards below the predetermined speed threshold;

controlling, by the one or more controllers, an electric park brake (EPB) to hold the vehicle at the stop state;

controlling, by the one or more controllers, the transmission to engage a dog clutch so as to place the transmission in the forward drive gear;

determining, by the one or more controllers, whether the dog clutch is or is not engaged;

controlling, by the one or more controllers, after determining the dog clutch is not engaged, the transmission to cycle a friction clutch between an engaged and disengaged state to facilitate engagement of the dog clutch;

determining, by the one or more controllers, after cycling the friction clutch, whether the dog clutch is or is not engaged; and controlling, by the one or more controllers, the EPB to i) deactivate if the dog clutch is determined to be engaged, or ii) maintain activation to maintain the vehicle at the stop state if the dog clutch is determined to be not engaged.

15. The method of claim 14, wherein controlling, by the one or more controllers, the transmission to engage the plurality of transmission clutches to bring the vehicle to the stop state includes engaging three clutches and slipping one friction clutch of the three clutches to transition the transmission to a state where the transmission output is bound.

16. The method of claim 14, further comprising:
receiving, at the one or more controllers, a request for an increase in engine torque;
determining, at the one or more controllers, whether the request for the increase in engine torque is above a predetermined engagement threshold for engagement of the dog clutch;
controlling, by the one or more controllers, after determining the request for the increase in engine torque is above the predetermined engagement threshold, the engine to temporarily override the request for the increase in engine torque; and
controlling, by the one or more controllers, the engine to transition to the request for the increase in engine torque after controlling the EPB to deactivate.

17. The method of claim 14, wherein controlling, by the one or more controllers, after determining the dog clutch is not engaged, the transmission to cycle the friction clutch between the engaged and disengaged states includes cycling the friction clutch between the engaged and disengaged states to lower or remove a torque load on the dog clutch to relieve a spline lock condition of the dog clutch.

18. The method of claim 14, wherein receiving, at one or more controllers, the request for the transmission garage shift to the drive gear, includes receiving, at the one or more controllers, the request for the transmission garage shift from park to drive, neutral to drive or reverse to drive.

* * * * *